(12) United States Patent
Pefkianakis et al.

(10) Patent No.: US 12,250,050 B2
(45) Date of Patent: Mar. 11, 2025

(54) BEAM SELECTION REFINEMENT FOR WIRELESS COMMUNICATION IN STATIC CONDITIONS

(71) Applicant: Apple Inc., Cupertino, CA (US)

(72) Inventors: Ioannis Pefkianakis, San Jose, CA (US); Zhenglian Cai, Cupertino, CA (US); Guillaume Monghal, San Diego, CA (US); Prashant H. Vashi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 17/848,564

(22) Filed: Jun. 24, 2022

(65) Prior Publication Data

US 2023/0035996 A1    Feb. 2, 2023

Related U.S. Application Data

(60) Provisional application No. 63/227,883, filed on Jul. 30, 2021.

(51) Int. Cl.
*H04W 16/28*    (2009.01)
*H04B 7/06*    (2006.01)
(Continued)

(52) U.S. Cl.
CPC ......... *H04B 7/0695* (2013.01); *H04L 1/0003* (2013.01); *H04W 16/28* (2013.01); *H04W 72/1273* (2013.01)

(58) Field of Classification Search
None
See application file for complete search history.

(56) References Cited

U.S. PATENT DOCUMENTS 8,526,961 B2    9/2013  Sanders et al.
10,243,276 B2   3/2019  Ford et al.
(Continued)

FOREIGN PATENT DOCUMENTS

CN    108702180    10/2018
CN    111918300    11/2020
(Continued)

OTHER PUBLICATIONS

Alrabeiah et al., "Millimeter Wave Base Stations with Cameras: Vision Aided Beam and Blockage Prediction," IEEE Vehicular Technology Conference, Oct. 2019, 6 pages.
(Continued)

*Primary Examiner* — Jay P Patel
(74) *Attorney, Agent, or Firm* — Fish & Richardson P.C.

(57) ABSTRACT

This application describes systems and processes for beam selection performance refinement in static conditions of wireless devices (e.g., user equipment UE). A data processing system of the UE is configured to perform a beam scan for testing multiple high gain candidate beams on a physical downlink shared channel (PDSCH) and link adaptation (LA) channel state information reference signal (LA-CSI-RS) while the UE is not moving and the data processing system of the UE determines that the channel is stable. The data processing system is configured to refine a given beam choice based on a determined capacity of the beams (e.g., from PDSCH signaling and/or LA-CSI-RS signals) to optimize data throughput.

20 Claims, 8 Drawing Sheets

(51) Int. Cl.
*H04L 1/00* (2006.01)
*H04W 72/1273* (2023.01)

(56) References Cited

U.S. PATENT DOCUMENTS

| | | | |
|---|---|---|---|
| 10,849,034 | B1 | 11/2020 | Chisu et al. |
| 11,239,981 | B2* | 2/2022 | Zhang .................. H04B 7/0695 |
| 11,463,980 | B2 | 10/2022 | Shi et al. |
| 11,575,452 | B2 | 2/2023 | Merlin et al. |
| 11,672,042 | B2 | 6/2023 | Jia et al. |
| 2016/0119926 | A1* | 4/2016 | Sahara .............. H04W 72/0453 370/329 |
| 2018/0368142 | A1* | 12/2018 | Liou ................. H04W 74/0808 |
| 2019/0166615 | A1* | 5/2019 | Nimbalker ............ H04W 72/21 |
| 2019/0239135 | A1* | 8/2019 | Levitsky ............... H04W 72/54 |
| 2019/0260501 | A1* | 8/2019 | Kim ...................... H04L 1/0005 |
| 2020/0059275 | A1* | 2/2020 | Kato .................... H04B 7/0626 |
| 2020/0119893 | A1* | 4/2020 | Zhang .............. H04W 72/0446 |
| 2020/0382189 | A1 | 12/2020 | Chen et al. |
| 2020/0404644 | A1 | 12/2020 | Zhu et al. |
| 2021/0320747 | A1* | 10/2021 | Yoshioka .............. H04L 1/0009 |
| 2022/0022231 | A1* | 1/2022 | Huang .................. H04L 1/1607 |
| 2022/0225118 | A1 | 7/2022 | Pefkianakis et al. |
| 2022/0385419 | A1* | 12/2022 | Paz ....................... H04W 72/02 |
| 2023/0044590 | A1 | 2/2023 | Pefkianakis et al. |
| 2023/0318686 | A1* | 10/2023 | Kwak ................... H04B 7/088 455/101 |
| 2023/0388089 | A1* | 11/2023 | Kwak ................. H04L 27/2607 |

FOREIGN PATENT DOCUMENTS

| | | |
|---|---|---|
| KR | 10-2020-0026133 | 3/2020 |
| WO | WO 2020/151643 | 7/2020 |
| WO | WO 2021/061412 | 4/2021 |

OTHER PUBLICATIONS

Developer.apple.com [online], "Getting Raw Accelerometer Events," Jun. 16, 2019, retrieved on Aug. 19, 2022, retrieved from URL<https://developer.apple.com/documentation/coremotion/getting_raw_accelerometer_events>, 8 pages.

Developer.apple.com [online], "Getting Raw Gyroscope Events," Jun. 16, 2019, retrieved on Aug. 19, 2022, retrieved from URL<https://developer.apple.com/documentation/coremotion/getting_raw_gyroscope events>, 8 pages.

Johnson, "5G New Radio in Bullets", 1st Edition, Jul. 28, 2019, 590 pages (abstract only), 7 pages.

Nitsche et al., "Steering with Eyes Closed: mm-Wave Beam Steering without In-Band Measurement," IEEE INFOCOM'15, Apr. 26, 2015-May 1, 2015, pp. 2416-2424.

Partial European Search Report in European Appln. No. 22181998.0, dated Dec. 16, 2022, 17 pages.

Pefkianakis et al., "Accurate 3D Localization for 60 GHz Networks," ACM SenSys'2018, Nov. 4-7, 2018, pp. 120-131.

Sur et al., "BeamSpy: Enabling Robust 60 GHz Links Under Blockage," Usenix NSDI'16, Mar. 16-18, 2016, Santa Clara, CA, 15 pages.

Sur et al., "WiFi-Assisted 60 GHz Wireless Networks," MobiCom'17, Oct. 16-20, 2017, 14 pages.

Wang et al., "X-Array: Approximating Omnidirectional Millimeter-Wave Coverage Using an Array of Phased Arrays," ACM MobiCom'20, Sep. 21-25, 2020, 14 pages.

Wei et al., "Pose Information Assisted 60 GHz Networks: Towards Seamless Coverage and Mobility Support," ACM MobiCom'17, Oct. 16-20, 2017, 14 pages.

Wei et al., "Facilitating Robust 60 GHz Network Deployment By Sensing Ambient Reflectors," USENIX NSDI'17, Mar. 27-29, 2017, 15 pages.

Wikipedia.org [online], "MUSIC (algorithm)," Jul. 14, 2022, retrieved on Aug. 19, 2022, retrieved from URL<https://en.wikipedia.org/wiki/MUSIC_(algorithm)>, 5 pages.

Yang et al., "Sensor-assisted Codebook-based Beamforming for Mobility Management in 60 GHz WLANs," IEEE MASS'15, Oct. 19-22, 2015, pp. 333-341.

\* cited by examiner

BEAM SELECTION REFINEMENT FOR WIRELESS COMMUNICATION IN STATIC CONDITIONS

CLAIM OF PRIORITY

This application claims priority under 35 U.S.C. § 119(e) to U.S. Patent Application Ser. No. 63/227,883, filed on Jul. 30, 2021, the entire contents of which are hereby incorporated by reference.

TECHNICAL FIELD

This disclosure relates generally to wireless communications.

BACKGROUND

Wireless devices can include phased array antennas for transmitting signals to and receiving signals from remote devices (e.g., in a wireless network). A phased array includes a computer-controlled array of antennas that creates one or more beams of radio waves that can be electronically steered to point in different directions without moving the antennas.

Beamforming or spatial filtering is a signal processing technique used by antenna arrays for directional signal transmission or reception. This is achieved by combining elements in an antenna array in such a way that signals at particular angles experience constructive interference while others experience destructive interference. Beamforming can be used at both the transmitting and receiving ends (e.g., by phased array antennas) in order to achieve spatial selectivity.

SUMMARY

This application describes systems and processes for beam selection performance refinement in static conditions of wireless devices (e.g., user equipment, UE). A data processing system of the UE is configured to perform a beam scan for testing multiple high gain candidate beams on a physical downlink shared channel (PDSCH) and link adaptation (LA) channel state information reference signal (LA-CSI-RS) while the UE is not moving and the data processing system of the UE determines that the channel is stable. The data processing system is configured to refine a given beam choice based on a determined capacity of the beams (e.g., from PDSCH signaling and/or LA-CSI-RS signals) to optimize data throughput.

As subsequently described in greater detail, UEs that use millimeter wave (mmWave) networks generally perform beamforming operations. Beamforming includes a functionality in which the UE focuses transmission energy in a specific direction (a beam) by configuring a phased array of transmitters, overcoming mmWave propagation loss. Beams are typically fixed and designed a-priori in codebooks such as phase-amplitude combinations for antenna elements. In a typical communications system, the UE performs multiple beam measurements on reference symbols, which are signals already known by the UE.

Cellular communication technologies, such as $3^{rd}$ Generation Partnership Project (3GPP) $5^{th}$ Generation New Radio (5G NR) mmWave communication systems, enable UEs to perform beam management measurement using synchronization symbol block (SSB) signals. These signals are single port signals as opposed to data signals (e.g., Physical Downlink Shared Channel, PDSCH) which are two port signals. A single port signal enables the UE to estimate, based on SSB signals, only general received power levels (reference signal received power or RSRP) or signal-to-noise or signal-to-interface-and-noise ratios (SNR or SINR) per beam. In this scenario, the beamforming process of the UE is a limited evaluation of beams based on these link metrics.

The systems and processes for beam selection performance refinement in static conditions of wireless devices described herein enable the UE to use the PDSCH signal for beamforming. PDSCH enables multiple input multiple output (MIMO) communications with more than one layer (e.g., two or more layers). A channel capacity depends on signal levels/SINR but also on the general conditioning of the channel matrix. Here, channel capacity refers to a total amount of throughput that a channel can accommodate.

Generally, to estimate the capacity of the MIMO channel over PDSCH, a UE uses a link adaptation CSI-RS (or LA-CSI-RS). The LA-CSI-RS is a 2 port reference signal. The UE estimates PDSCH channel capacity by the LA-CSI-RS and reports to the base station (e.g., a next generation nodeB or gNB) using channel quality indicator (CQI), rank indicator (RI) and precoding matrix indicator (PMI). The systems and processes described herein enable the UE to use LA-CSI-RS to evaluate beams of the UE.

The systems and processes described in this document enable one or more of the following advantages. The systems and processes described herein enable a UE to estimate PDSCH capacity (e.g., throughput) before selecting a final beam during a beam acquisition process. Typically, the UE first selects a beam (e.g., during a beam acquisition process) based on information included in the SSB (and in some cases, single port signals). This is because the LA-CSI does not have multiple repetitions. The CSI reference signals are also available in CQI reports that correspond to the channel capacity on PDSCH. The UE subsequently is enabled to estimate PDSCH capacity. However, in this case, the UE does not choose a beam based on a channel capacity estimate. As a result, the UE does not necessarily chose an optimal beam, wherein the optimal beam has a higher throughput or capacity than other available beams.

The processes described herein enable the UE use an estimate of a channel capacity to choose a beam. The UE is configured to analyze multiple high gain candidate beams on a PDSCH or with LA-CSI-RS signals. The UE is configured to refine a beam choice based on capacity estimates so that the UE can fully optimize throughput. The UE can refine beam selection when the UE detects that it is stationary.

The UE includes a classifier that classifies channel stability metrics (e.g., based on RSRP/SNR or any other link metrics). The classifier is configured to perform classification when motion data from a motion sensor indicates that the UE is static, rather than mobile. A static scenario refers to situation in which the UE is not moving, turning, or otherwise changing a position or orientation relative to a base station for a given period of time. A mobile scenario is a situation in which the UE is moving or turning currently, or has changed a position or orientation with respect to the base station within a recent time period. When the UE is static, the UE is eligible to enter a state of further beam refinement. The UE includes a beam scheduler module and a capacity estimator module to perform beam selection based on channel capacity when operating in the static state. In this manner, the UE is enabled to select beams having the best overall capacity, rather than merely selecting a beam with a highest detected power or similar link metric.

The one or more advantages previously described can be enabled by one or more implementations as described in the following sections.

In a general aspect, a method includes determining, based on motion data from a motion sensor coupled to a wireless device, that a channel is stable for communications between the wireless device and a remote device; selecting, from a set of available beams, a set of candidate beams; for a candidate beam of the set of candidate beams, establishing signaling for a physical downlink shared channel (PDSCH); determining a modulation and coding scheme (MCS) threshold set by the remote device for the PDSCH signaling; estimating, based at least on the MCS threshold, a channel capacity of the PDSCH; and selecting, based at least on the estimated channel capacity, a particular beam from the set of candidate beams, for further PDSCH communication.

In some implementations, the MCS threshold represents a modulation order of the MCS, the modulation order specifying a number of symbols and a coding rate of PDSCH signals, and wherein estimating the channel capacity comprises determining data throughput based on the number of symbols and the coding rate.

In some implementations, selecting the set of candidate beams comprises selecting the set of candidate beams based at least on a relative power level of each candidate beam with respect to one or more other available beams.

In some implementations, selecting the set of candidate beams comprises selecting the set of candidate beams based at least on a location of each candidate beam with respect to one or more other available beams.

In some implementations, determining that the channel is stable comprises: obtaining motion data from one or more motion sensors coupled to the wireless device; determining, from the motion data, that the wireless device is static relative to the remote device in communication with the wireless device; obtaining data representing one or more link metrics of the beam, the link metrics being associated with a period of time that the wireless device is static; and determining that a value of one or more of the link metrics satisfies a stability threshold value. In some implementations, the one or more link metrics include at least one of a signal to noise (SNR) ratio of a signal received from the remote device, a delay spread value of the signal, a magnitude of a change in an angle of arrival (AoA) of the signal, or a reference signal received power (RSRP) of the signal.

In some implementations, the stability threshold value is based at least on a standard deviation of the value of one or more of the link metrics.

In some implementations, wherein the one or more motion sensors comprise one or more of an accelerometer or a gyroscope.

In some implementations, the wireless device and the remote device are configured for millimeter wave (mmWave) communication using frequency range 2 (FR2).

In some implementations, the method further includes retrieving the motion data periodically to determine if the wireless device is moving or is static.

In some implementations, the wireless device includes an antenna array including at least 10 beam configurations, and wherein selecting the particular beam comprises selecting one of the at least 10 beam configurations.

In a general aspect, a method includes determining, based on motion data from a motion sensor coupled to a wireless device, that a channel is stable for communications between the wireless device and a remote device; selecting, from a set of available beams, a set of candidate beams; for a candidate beam of the set of candidate beams, establishing signaling for a physical downlink shared channel (PDSCH); receiving a link adaptation (LA) channel state information reference signal (LA-CSI-RS); estimating, based at least on the LA-CSI-RS, a channel capacity of the PDSCH; and selecting, based at least on the estimated channel capacity, a particular beam from the set of candidate beams, for further PDSCH communication.

In some implementations, selecting the set of candidate beams comprises selecting the set of candidate beams based at least on a relative power level of each candidate beam with respect to one or more other available beams.

In some implementations, selecting the set of candidate beams comprises selecting the set of candidate beams based at least on a location of each candidate beam with respect to one or more other available beams.

In some implementations, determining that the channel is stable comprises: obtaining motion data from one or more motion sensors coupled to the wireless device; determining, from the motion data, that the wireless device is static relative to the remote device in communication with the wireless device; obtaining data representing one or more link metrics of the beam, the link metrics being associated with a period of time that the wireless device is static; and determining that a value of one or more of the link metrics satisfies a stability threshold value.

In some implementations, the one or more link metrics include at least one of a signal to noise (SNR) ratio of a signal received from the remote device, a delay spread value of the signal, a magnitude of a change in an angle of arrival (AoA) of the signal, or a reference signal received power (RSRP) of the signal.

In some implementations, the stability threshold value is based at least on a standard deviation of the value of one or more of the link metrics.

In some implementations, the one or more motion sensors comprise one or more of an accelerometer or a gyroscope.

In some implementations, the wireless device and the remote device are configured for mmWave communication using frequency range 2 (FR2).

In some implementations, the method further comprises retrieving the motion data periodically to determine if the wireless device is moving or is static.

In a general aspect, a user equipment (UE) includes at least one motion sensor; one or more antenna arrays each configured for at least two beam configurations; one or more processors; and a non-transitory computer-readable storage medium storing instructions which, when executed by the one or more processors, cause the one or more processors to perform operations as described herein.

The details of one or more implementations are set forth in the accompanying drawings and the description below. The techniques described here can be implemented by one or more wireless communication systems, components of a wireless communication system (e.g., a station, an access point, a user equipment, a base station, among others), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
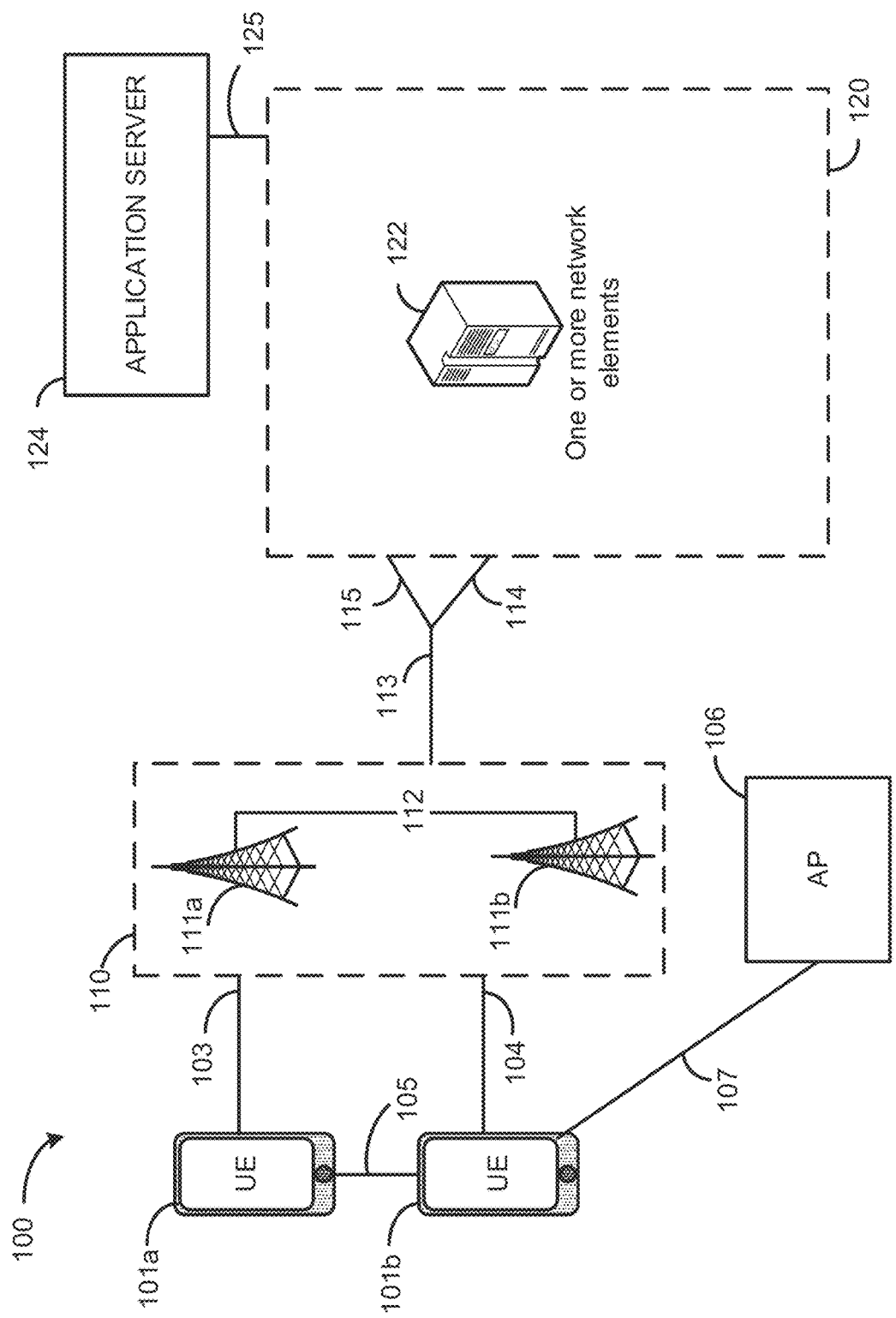
FIG. 1 illustrates an example wireless communication system, according to various embodiments herein.

The techniques described here enable a wireless device to perform beam selection in response to changes to the channel of a communications link. A device includes one or more sensors that provide motion data to the device. The device is configured to perform beamforming in response to receiving the motion data. This enables the device to perform beamforming to improve communication performance.

Generally, the wireless networks include transmissions using the millimeter wave (mmWave) spectrum. For example, the mmWave spectrum can be used for new radio (NR) Fifth Generation (5G) and/or Long Term Evolution (LTE) networks for mmWave frequency ranges (e.g., frequency range 2 (FR2), frequency range 3 (FR3), among others) transmissions from base stations (e.g., gNBs) or to and from client devices (e.g., mobile devices described throughout this description). In general, FR2 transmissions are between 24.25 GHz to 52.6 GHz. Generally, cellular mmWave transmissions have a high propagation loss compared to traditional microwaves in the sub 3 GHz range. For example, mmWave transmissions can have an additional 20 dB loss relative to sub 6 GHz bands, such as those used for frequency range 1 (FR1) transmissions.

To overcome this additional loss, mmWave-enabled devices described herein are configured for beamforming, beam management, and antenna selection based on sensor feedback of one or more sensors of the mmWave-enabled device. Beamforming enables a device to steer the radiofrequency (RF) energy in a particular direction. The transmitting device forms a beam by varying an amplitude and/or a phase of one or more elements of a phased array antenna. Generally, the transmitting device generates a beam based on predefined phase-amplitude combinations for each antenna of the array to ensure that a narrow beam of relatively high power is transmitted in a desired direction with respect to the phased array antenna. Beam management enables a device to identify an optical beam for transmission in each of the uplink and downlink directions. Beam selection enables an mmWave-enabled device (e.g., a UE) to ensure high-speed connectivity by improving wireless coverage for a given uplink or downlink transmission.

Beam management includes processes by which the UE modifies settings of phase shifters of the phased antenna array. Beam management includes receiving, from a remote device such as a base station, a reference signals known to the UE. Typically, the base station sends multiple signals using the same transmission configuration, including a same transmission (Tx) power, Tx antenna pattern, and Tx precoding. The UE can measure link metrics using several different phase shifters settings (called a beam scan). The UE takes measurements on those reference signals. Generally, the UE takes multiple measurements with multiple phase shifters settings on a reference signal using the same transmission configuration. Based on those measurements, the UE attempts to optimize the phase shifter settings for the ongoing communication and the specific transmission configuration the base station used to obtain a beam with the best overall link metrics.

Generally, the beam selection is performed to improve communication bandwidth in the context of mmWave systems (e.g., using FR2 frequencies, FR3 frequencies, or other mmWave frequencies). mmWave communication links have a relatively high propagation loss over long distances (e.g., over 10s or 100s of meters) relative to losses for FR1 links. To mitigate propagation loss and improve performance of a communication link, mmWave-enabled devices are configured for beamforming, beam management, and antenna selection based on sensor feedback of one or more sensors of the mmWave-enabled device.

The UE receives reference signals periodically (e.g., nearly continuously) from a base station or other remote device. The UE periodically (e.g., nearly continuously) optimizes phase shifter settings for beamforming. For example, a Synchronization Signal Block (SSB) is a block of 4 symbols, each including reference symbols. The UE uses the demodulation reference signal (DMRS) including these symbols for beam management.

In some implementations, the UE performs beam management using a codebook. The codebook includes a set of phase shifter settings, each corresponding to a respective beam. The codebook enables the UE to perform beam management as follows. The UE tries a beam on reference symbols, and then uses the beam with a best corresponding measurement of respective link metrics. The codebook has number of possible beams that is not too large compared to the number of measurement occasions available. The number of measurement occasions corresponds to a number of measurement symbols available with the same transmission configuration in a given time.

To comply with radio frequency (RF) requirements, the UE can include multiple phased arrays (e.g., 4 elements each, 8 elements each, or 16 elements each, among others). The codebook size can be larger than 30 beams. Generally, a base station provides the SSB signal for UE beam management, which enables up to 4 measurements every 20 milliseconds. Thus, the UE performs the initial acquisition phase, in which the UE acquires the best beam in multiple steps, if no additional information is available. The UE then performs a tracking phase where the UE tracks the best UE beam by measuring a limited number of beams based on the best current beam.

Beam management enables a device to identify an optimal beam for transmission in each of the uplink and downlink directions. In an example, for 5G NR mmWave transmissions, a node (e.g., a gNB) transmits SSBs periodically (e.g., between 5 to 160 millisecond (monitoring system) periods)

to identify best transmit and receive beams. In an example of beam management, a UE can perform an initial beam training step using multiple beams. In this first step, a wide sweeping range is covered using wider beam widths. A second step includes a beam refinement step. In this step, the UE sweeps over narrower beams over a narrower range than in the first step. This enables the UE to hone in on the desired beam direction. In the third step, the device is configured for beam refinement. In the beam refinement step, a user equipment (UE) performs tuning of the receive angle for the beam, and the node transmits using a fixed beam. The UE measures different signal strengths until an optimal configuration of the beams is found. However, other methods for beam management can be performed. In an example, for a 802.11ad/ay mmWave transmission, an access point (AP) and a wireless device (e.g., a UE) train their respective beams during sector level sweep (SLS) and the beam refinement process (BRP) as defined in 802.11 standards.

Antenna selection enables a device (e.g., a UE) to ensure high-speed connectivity by improving wireless coverage for a given uplink or downlink transmission. In an example, either of a blockage of a first antenna or an antenna misalignment can cause throughput levels to decrease relative to an ideal transmission environment. In this case, the UE is configured to select from a plurality of phased antenna arrays (also called antenna panels).

The mmWave-enabled devices include one or more sensors configured to provide motion data. The motion data indicates how the device has moved in an environment. The motion data from the sensors enables the device to estimate beamforming parameters for an optimal connection based on previous data indicating a strong signal.

A data processing system of a UE is configured to determine whether the UE is in a static scenario or a mobile scenario. A static scenario refers to situation in which the UE is not moving, turning, or otherwise changing a position or orientation relative to a base station for a given period of time. A mobile scenario is a situation in which the UE is moving or turning currently or has changed a position or orientation with respect to the base station within a recent time period (e.g. within 5 seconds or less, though the threshold can be shorter or longer as needed). Based on the determination of whether the UE is static or mobile, the UE performs beam selection.

Additional examples of these processes are subsequently described in relation to the figures. The systems and processes described are compatible with any mmWave technologies (e.g., 802.11ad/ay, 5G, among others). The system is lightweight and is configured to select a beam, antenna, or both independent of any antenna or beam scanning.

FIG. 1 illustrates an example wireless communication system 100. For purposes of convenience and without limitation, the example system 100 is described in the context of the LTE and 5G NR communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some examples, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with an access network (AN) or radio access network (RAN) 110. In some examples, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols. In some examples, the UEs 101 may directly exchange communication data using an interface 105, such as a ProSe interface. The interface 105 may alternatively be referred to as a sidelink interface 105 and may include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101b is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi®) router. In this example, the AP 106 is shown to be connected to the Internet without connecting to the core network of the wireless system, as described in further detail below. In various examples, the UE 101b, RAN 110, and AP 106 may be configured to use LTE-WLAN aggregation (LWA) operation or LTW/WLAN radio level integration with IPsec tunnel (LWIP) operation. The LWA operation may involve the UE 101b in RRC CONNECTED being configured by a RAN node 111a, 111b to utilize radio resources of LTE and WLAN. LWIP operation may involve the UE 101b using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs (gNBs), eNodeBs (eNBs), NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some examples, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some examples, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some examples, an individual RAN node 111 may represent individual gNB distributed units (DUs) that are connected to a gNB central unit (CU) using individual F1 interfaces (not shown in FIG. 1). In some examples, the gNB-DUs may include one or more remote radio heads or RFEMs, and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some examples, an RSU is a computing device coupled with radio frequency circuitry located on a roadside that provides connectivity support to passing vehicle UEs 101 (UEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

Any of the RAN nodes 111 can terminate the air interface protocol and can be the first point of contact for the UEs 101. In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink and ProSe or sidelink communications), although the scope of the techniques described here not limited in this respect. The OFDM signals can comprise a plurality of orthogonal subcarriers.

In some examples, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

In some examples, the UEs 101 and the RAN nodes 111 communicate (e.g., transmit and receive) data over a licensed medium (also referred to as the "licensed spectrum" or the "licensed band") and an unlicensed shared medium (also referred to as the "unlicensed spectrum" or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

Figure 2:
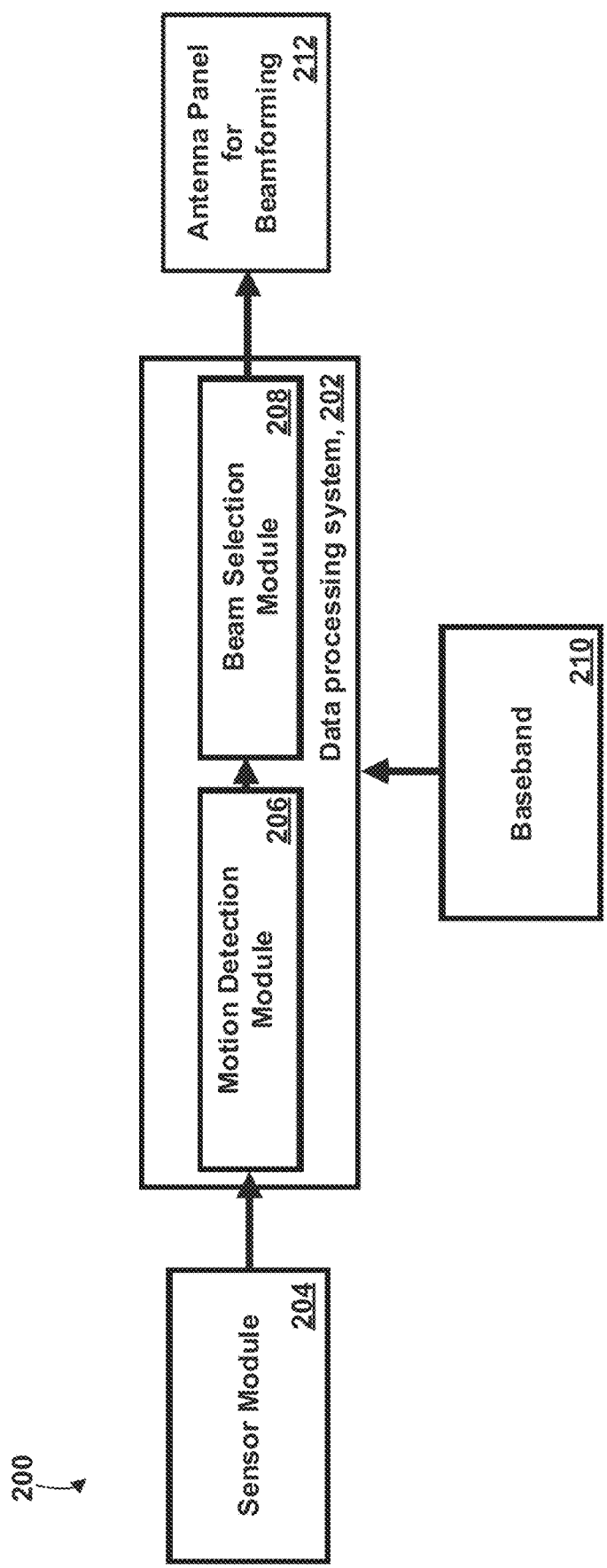
FIG. 2 illustrates an example of a platform or device configured for sensor-assisted antenna and beam selection in accordance with some implementations of the present disclosure.

FIG. 2 illustrates an example of a platform or device 200 configured for sensor-assisted antenna and beam selection in accordance with some implementations of the present disclosure. The wireless device 200 of FIG. 2 includes sensor module 204, a motion detection module 206 configured to receive data from the sensor module 204, a beam selection module 208 configured to select particular beam, and a least one antenna panel 212 for performing beamforming to transmit data from the wireless device 200. The wireless device 200 receives wireless data through baseband circuitry 210, as subsequently described.

The data processing system 202 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the data processing system 202 may be coupled with or may include memory/storage elements and may be configured to execute instructions stored in the memory or storage to enable various applications or operating systems to run on the system 200. In some examples, the memory or storage elements may be on-chip memory circuitry, which may include any suitable volatile or non-volatile memory, such as DRAM, SRAM, EPROM, EEPROM, Flash memory, solid-state memory, or combinations of them, among other types of memory.

The processor(s) of data processing system 202 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the data processing system 202 may include, or may be, a special-purpose processor/controller to carry out the techniques described herein.

As examples, the processor(s) of data processing system 202 may include an Apple A-series processor. The processors of the data processing system 202 may also be one or more of an Intel® Architecture Core™ based processor, such as a Quark™, an Atom™ an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the data processing system 202 may be a part of a system on a chip (SoC) in which the data processing system 202 and other components are formed into a single integrated circuit.

Additionally or alternatively, the data processing system 202 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some examples, the data processing system 202 may include logic blocks or logic fabric, and other interconnected resources that may be programmed to perform various functions, such as the procedures, methods, functions described herein. In some examples, the data processing system 202 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 210 may be implemented, for example, as a solder-down substrate including one or more integrated circuits, a single packaged integrated circuit soldered to a main circuit board or a multi-chip module including two or more integrated circuits.

The antenna beam panel 212 (also called a radio front-end module (RFEM)) may comprise a millimeter wave (mmWave) RFEM and one or more sub-mmWave radio frequency integrated circuits (RFICs). In some examples, the one or more sub-mmWave RFICs may be physically separated from the mmWave antenna beam panel 212. The RFICs may include connections to one or more antennas or antenna arrays, and the antenna beam panel 212 may be connected to multiple antennas. In some examples, both mmWave and sub-mmWave radio functions may be implemented in the same physical antenna beam panel 212, which incorporates both mmWave antennas and sub-mmWave. In some implementations, the mmWave functions implement the IEEE 802.11ad and 802.11 ay standards.

The platform 200 may also include interface circuitry (not shown) for connecting external devices with the platform 200. The external devices connected to the platform 200 using the interface circuitry include sensor circuitry and electro-mechanical components (EMCs), as well as removable memory devices coupled to removable memory circuitry.

The sensor circuitry 204 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lens-less apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others. These sensors are further described in relation to FIG. 4. As the pose of the system 200 changes in an environment of the system, the sensors 204 capture the motion of the system and send the motion data to a motion detection module 206.

The data processing system 202 is configured to host the motion detection module 206 and a beam selection module 208. The motion detection module 206 is configured to determine, from the motion data of the sensors 204, how the device is moving in an environment. The motion detection module 206 can determine a new position and orientation (e.g., a pose) of the device relative to a prior pose of the device for which an optimal beam and antenna were selected. The updated pose can be provided to the beam selection module 208.

Figure 4:
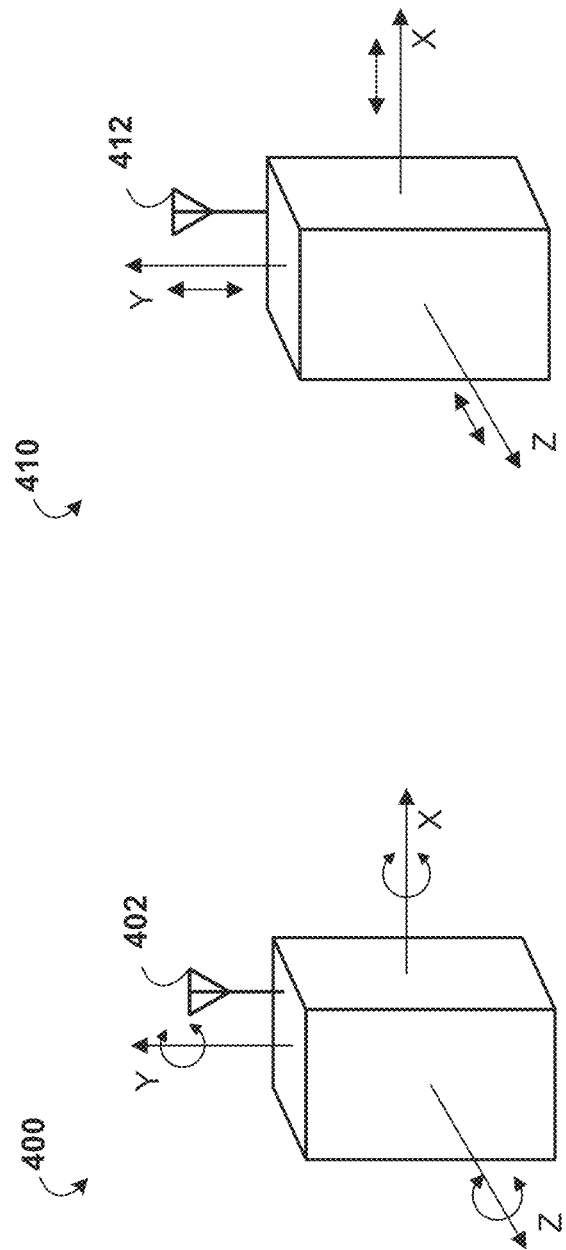
FIG. 4 illustrates example devices for motion and rotation detection for sensor-assisted antenna and beam selection in accordance with some implementations of the present disclosure.

Briefly turning to FIG. 4, devices 400 and 410 show examples of data gathered by sensors 204 of FIG. 2. For example, device 400 includes a gyroscope. The gyroscope is configured to measure a rate at which the device 400 rotates around a spatial axis including a rotational pitch, roll, and yaw, movement (e.g., in degrees or radians) of the device 400. The device 400 enables a data processing system receiving the data from the gyroscope to determine change in orientation of one or more antennae (such as antenna 402), such as with respect to a base station. Similarly, device 410 includes accelerometer(s) configured to measure changes in velocity along x, y, and z axes (e.g., translational motion) for the device 410. The device 410 enables a data processing system receiving the data from the accelerometer to determine change in orientation of one or more antennae (such as antenna 402), such as with respect to a base station. Devices 400 and 410 are combinable into a single device including both gyroscope(s) accelerometer(s).

Returning to FIG. 2, the motion detection module 206 receives accelerometer motion data and identifies a translational movement (e.g., in centimeters) along each of the x, y, and z axes. The motion detection module 206 receives the gyroscope motion data and determines a rotation of the device around each of the x, y, and z axes. The result is an updated pose of the system 200 relative to a prior pose of the system. The initial pose of the system is determined relative to the remote device connected by the communications link.

The initial pose can be determined based on AoA data (e.g., from the BB panel 210). In some implementations, a one-time beam sweep is performed to determine the AoA if the AoA data are not available, as subsequently described. The motion detection module 206 sends the motion data to the beam selection module 208 which is configured for beam selection.

The beam selection module 208 performs selection of the beam based on data from the BB panel 210 and the updated pose provided by the motion detection module 206. Because beam radiation patterns and antenna positions are predefined for a given device (e.g., device of system 200), the beam selection module 208 includes coverage map data. The coverage map data includes a highest gain antenna panel and beam identities for each available device orientation and position.

Figure 3A:
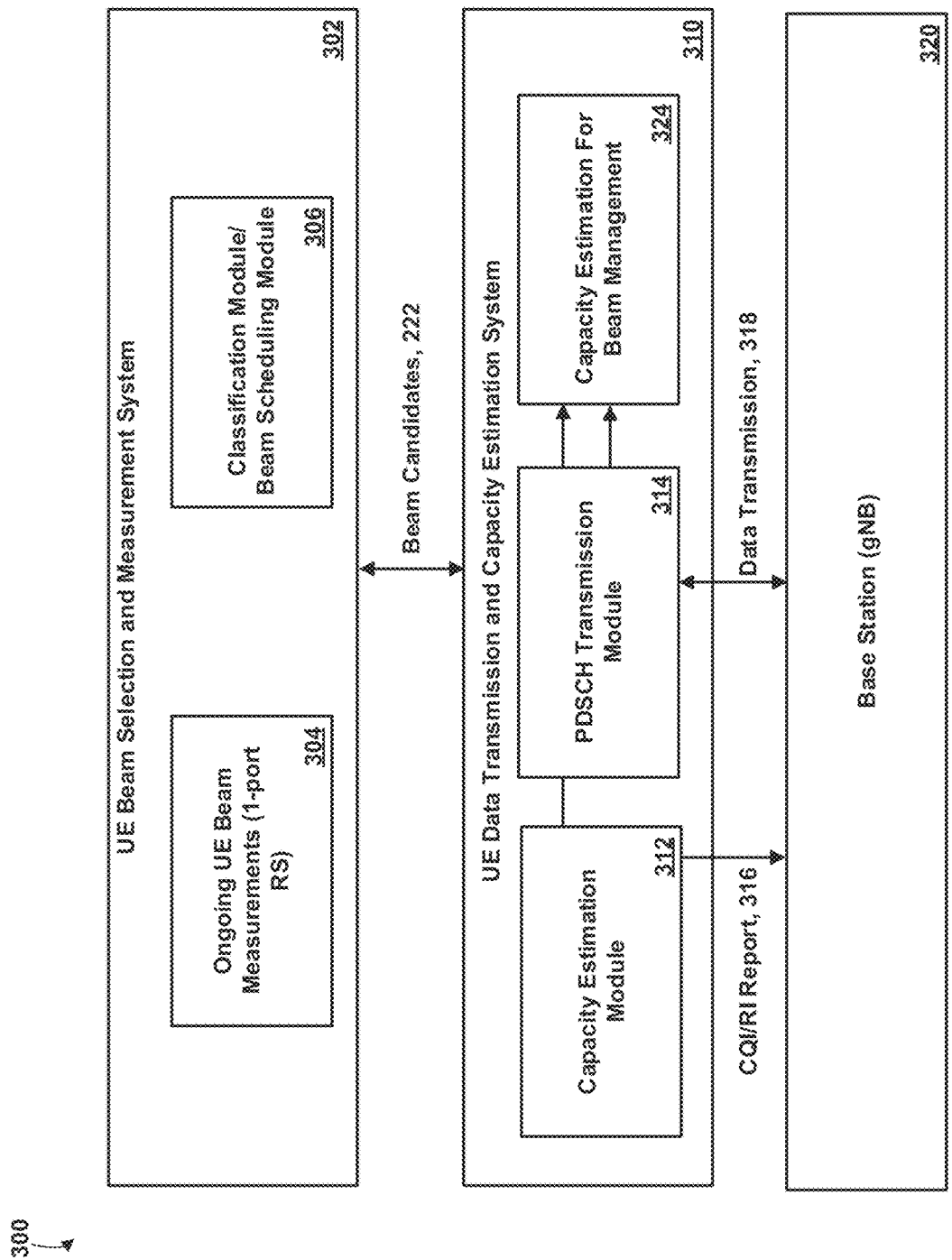
FIG. 3A illustrates an example system including the device or platform of FIG. 2, the system being configured for sensor-assisted antenna and beam selection in accordance with some implementations of the present disclosure.

FIG. 3A illustrates an example system 300 including the device or platform of FIG. 2, the system being configured for sensor-assisted antenna and beam selection in accordance with some implementations of the present disclosure. In some implementations, the functionality of any of the modules or systems of FIG. 3A can be combined into one or more modules or systems. For example, the data processing system 202 can execute one or more functions of one or more of the modules of FIG. 3A. The beam selection system 302 can be similar to the beam selection module 208 previously described in relation to FIG. 2. The beam selection system 302 includes a beam measurement module 304 and a classification and beam scheduling module 306. The system 300 includes a capacity estimation system 310, includes a capacity estimation module 312, a PDSCH transmission module 314, and a capacity estimation+beam management module 324. The systems 302 and 310 can be part of the data processing system 202, previously described. Modules of the capacity estimation system 310 is configured to communicate with a base station 320 (e.g., gNB), such as to send CQI signals and data transmissions 218. Generally, the system 302 is configured to execute a classifier (e.g., of classification module 306) using a given channel stability metric. Generally, the system 310 is configured to perform beam scheduling and capacity estimation when the UE is in a stable state for further beam refinement.

Generally, the beam measurements module 304 is configured to obtain link metric values. The link metrics can include a signal to noise ratio (SNR or SINK), RSRP, delay spread, angle of arrival (AoA) if available, channel frequency response, or similar link metrics for wireless signals. Generally, the system 302 is configured to execute a classifier (e.g., of classification module 306) using a given channel stability metric from module 304. The classification and beam scheduling module 306 is configured to classify the signal as stable or unstable. An unstable signal is a signal in which one or more link stability metrics do not satisfy a stability threshold. Link stability metrics can include threshold value of a link metric (e.g., a value of RSRP) or function of the link metric value (e.g., a standard deviation of the RSRP for values measured during a given period). If the link stability metrics do not satisfy a threshold, the classification module 306 indicates that the measured signal is classified as unstable. If the link stability metrics satisfy the threshold(s), the signal is classified as stable. For example, the classification module 306 can determine that a metric such as RSRP or SNR satisfies the threshold and that the UE is immobile. The classification module 306 indicates that the UE is in a stable state that enables further beam refinement.

When the UE is in a stable state, the UE is considered to have a connection that is stable enough to enable the UE to evaluate the performance of alternate beams with high Rx power on PDSCH/LA-CSI-RS as those channel either require a long time to estimate performance or are scheduled infrequently. Further beam refinement on PDSCH/LA-CSI-RS can thus be performed when the UE is in a channel stable situation. The channel stability provides enough time to assess capacity for each beam of a set of candidate beams based on LA-CSI-RS and/or PDSCH.

Generally, the classification module 306 can perform an assessment of whether the UE is in a stable state using the specific channel stability metric (such as RSRP stability per beam, variability of the channel per subcarrier, SNR stability, among others). Alternatively or in addition, the UE can refer to the motion data of the motion sensors (e.g., a gyroscope or accelerometer) that indicate unambiguously whether the UE is moving at all. Generally, a lack of movement supplements measuring link metrics to guarantee channel stability.

Once the UE is in the stable state for further beam refinement, the channel is stable and the UE generally is not moving. In an example, if the UE is on a stand or table without being adjusted, such as when a user is watching a video. In some implementations, the UE can also have a reasonable line of sight to the base station 320. If the UE moves, the UE is no longer in the stable state and ends performance of further beam refinement. In unstable scenarios, the UE operates using a mode of operation in which beam decision is only based on SSBs and/or single port signals.

The classification module 306 includes a classifier. The classifier can be a result of a machine learning model that is trained with motion data. In some implementations, the thresholds for the link stability metrics (e.g., SNR deviation, delay spread, or any other channel metrics) are determined by training the classifier prior to run-time (e.g., using machine learning (ML) or similar models). For example, a machine learning model can be trained with data including various values of the metrics to classify the measured beam as being stable or unstable for each of the various combinations of link metric values. The machine learning model can be used to determine the appropriate thresholds for each of the one or more metrics to ensure that a characterization of a signal of the current beam as being stable or unstable represents the correct scenario. The threshold values can be set based on outputs of the trained machine learning model.

In addition to using link stability metrics, the data processing system 202 of the UE classifies the UE as static or in motion based on motion data from the sensors, as previously described. If the UE is in motion, the signal is considered unstable, regardless of stability link metric values.

The beam selection system 302 selects a set of one or more beam candidates 222 based on determining that the signal is stable. The transmission and capacity estimation system 310 performs channel capacity/throughput estimation each beam candidate of the set of candidate beams. As subsequently described, the candidate beams 222 can include all the beams within a certain threshold of the beam with maximum received power as measured by beam measurements on SSBs/1 port signals. The classification module 306 is configured to determine whether beams are eligible for being candidate beams based on comparing link metrics to the threshold. The threshold can be set by a machine learning model in a manner similar to the stability classifier. For example, eligible beams may include all beams with at least 90% power relative to a beam having maximum power. Other thresholds and metrics are possible for developing the classifier.

The capacity estimation system 310 includes a capacity estimation module 312, a PDSCH reception module 314, and a capacity estimation and beam management module 324. The capacity estimation module 312 is configured to estimate potential throughput for each candidate beam by post processing LA-CSI-RS. For example, the capacity estimation module 312 can obtain, for each beam, a channel capacity estimate based on LA-CSI-RS (e.g., related to CQI/RI report 316 indicating channel quality). The PDSCH reception module 314 is configured to perform PDSCH reception of data 318 using the PDSCH. The PSDCH reception module 314 and the capacity estimation module 312 enable the UE to evaluate the capacity of various beams (e.g., high gain beams) as the various beams are selected for evaluation. The test of each of the high gain beams is managed by the beam management 324 module.

The beam management module 324 is configured to determine the throughput estimate for each tested beam and select a particular beam based on the tests. The beam management module 324 performs beam scheduling in order to test each candidate beam while a stable link is available.

When in the stable state, the system 310 of the UE exploits the channel stability by including feedback from the channel capacity estimation of module 312 for the beam selection process. The capacity estimation module 324 sends feedback data including a capacity estimate for a current, tested beam to a beam scheduler when the UE is stable and performing further beam refinement. The beam scheduling module 306 determines which beam is the best in terms of capacity in the current position of the UE with respect to the base station.

Figure 3B:
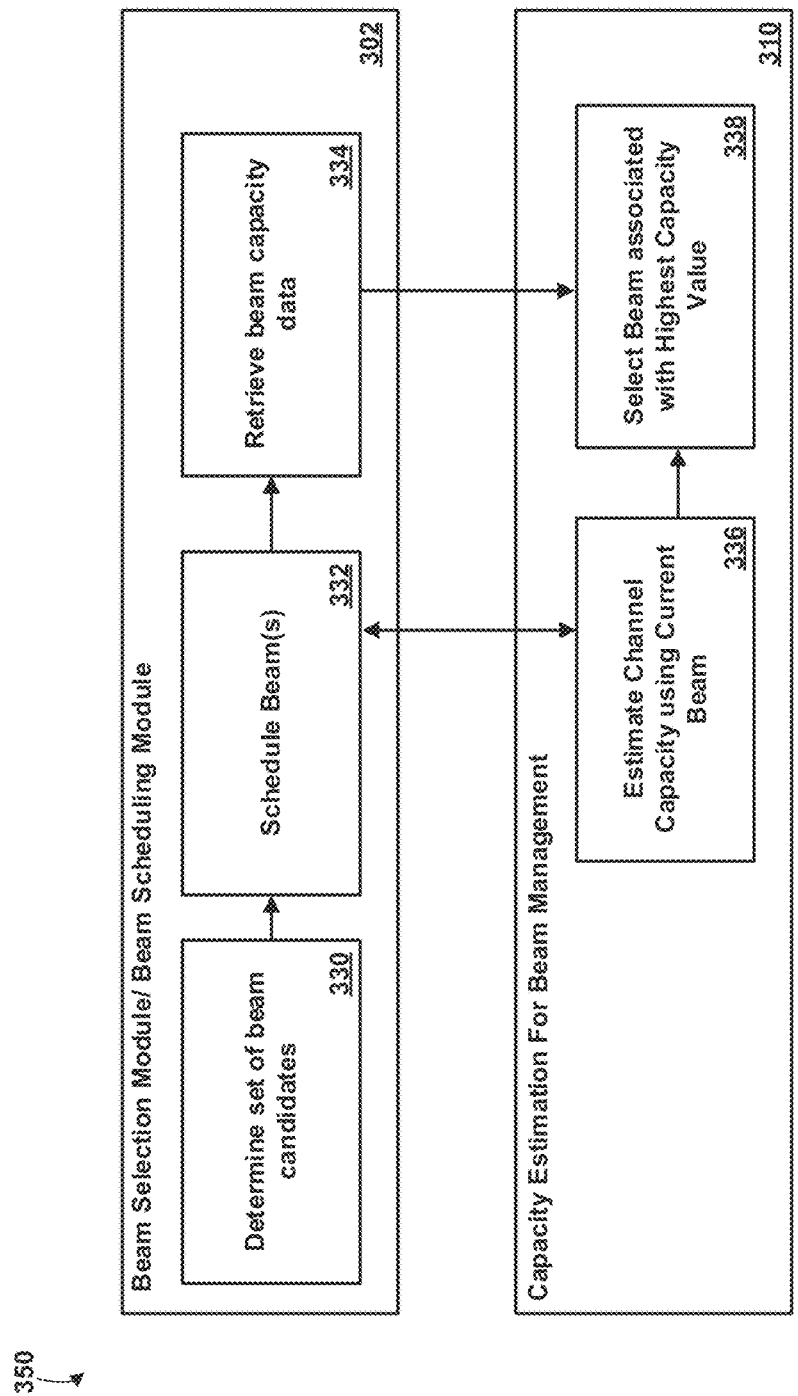
FIG. 3B illustrates an example process performed by portions of the system of FIG. 3A for sensor-assisted antenna and beam selection in accordance with some implementations of the present disclosure.
Figure 5:
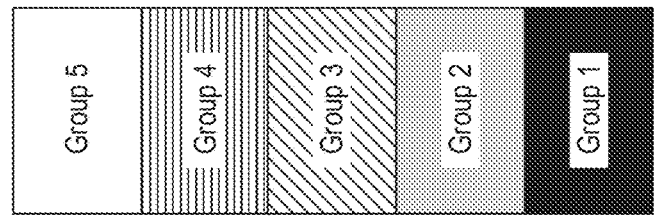
FIG. 5 illustrates example groups of beams for beam acquisition.
Figure 5:
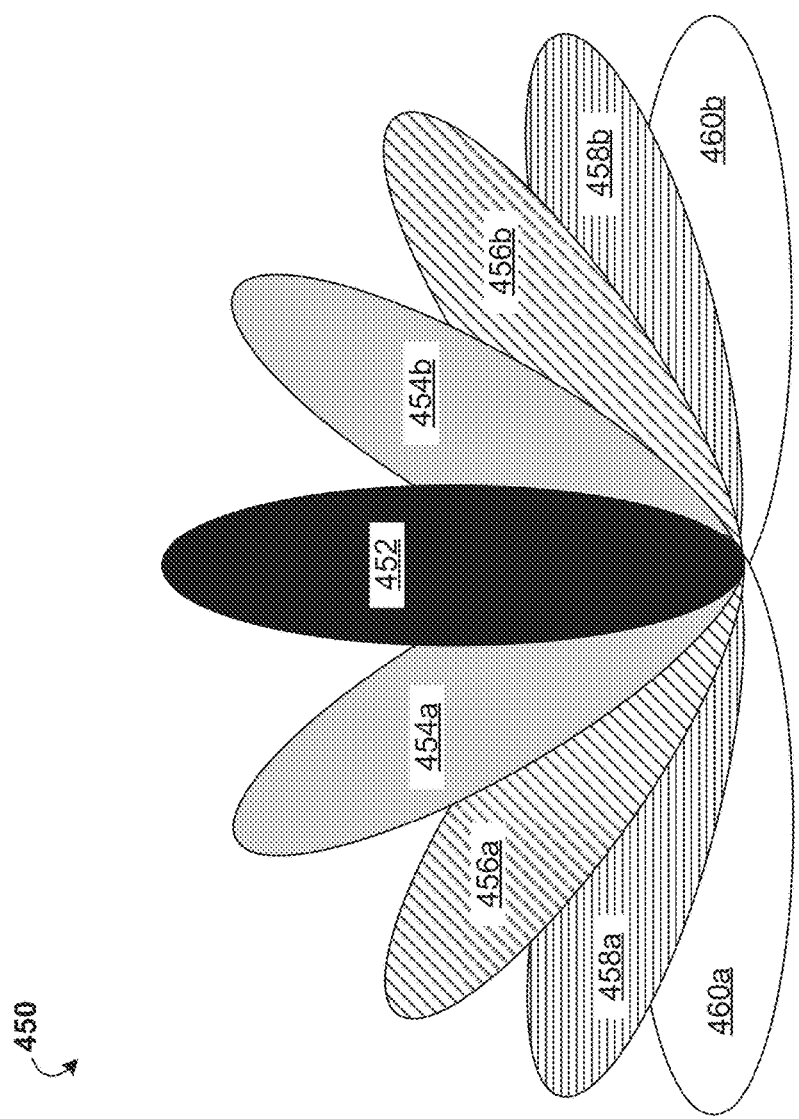

FIG. 3B illustrates an example process 350 performed by portions of the system of FIG. 3A for sensor-assisted antenna and beam selection in accordance with some implementations of the present disclosure. The beam selection module 302 determines (330) a set of beam candidates based on single port or SSB measurements. The candidate beams satisfy one or more metric thresholds (e.g., a power value above a minimum absolute or relative value). For example, power thresholds can be −1 dB or −2 dB. In some implementations, the candidate beams can be next neighbor beams to the highest power beam, such as in the same group (as shown in FIG. 5). The beam selection module 302 schedules (332) one or more beams that satisfy the thresholds established for being candidate beams.

The set of candidate beams are scheduled and each tested for beam capacity or throughput when the UE is in a stable state for beam refinement. The capacity for each beam is determined or estimated (336) by the capacity estimation module 324 as follows.

In a first scenario, the capacity estimation module 312 determines, from the LA-CSI-RS, channel capacity. The LA-CSI-RS is generally used to estimate the channel capacity and report channel quality information back to the base station. LA-CSI-RS is a downlink only signal and used for downlink (DL) CSI acquisition. The LA-CSI-RS can be a CSI-RS configured for reporting CSI information, namely CQI, RI and PMI. The LA-CSI-RS is used for UL reciprocity based pre-coding. Generally, the CSI-RS may start at any OFDM symbol of the slot and it usually occupies 1/2/4 OFDM symbols depending upon configured number of ports. In some implementations, the CSI-RS can be periodic, semi-persistent or aperiodic (due to DCI triggering). In some implementations, for time/frequency tracking, CSI-RS can either be periodic or aperiodic and is transmitted in bursts of two or four symbols which are spread across one or two slots.

Generally, the LA-CSI-RS is available periodically (e.g., every 100 milliseconds), but the LA-CSI-RS can also be aperiodic and sent on a near-periodic basis (e.g., without a strict schedule). The LA-CSI-RS enables the UE to calculate channel capacity, based on which the UE can derive CQI/RI/PMI. This is also called a direct estimation. The module 310 can test a beam when the CQI/RI report 316 is made and determine the channel estimate.

In a second scenario, the channel capacity estimation is performed by module 324 using PDSCH transmissions 318 from module 314. Using the PDSCH can bypass a need to time the test for the periodic LA-CSI-RS based measurement. When the PDSCH is transmitted to the base station 320, the base station uses a modulation coding scheme (MCS) including a modulation order and coding order. If the MCS modulation order is too high for the current beam, the UE is not able to decode the modulation. A higher order MCS refers to a modulation alphabet is extended to include additional signaling alternatives, allowing for more bits of information to be communicated per modulation symbol (e.g., a higher data throughput or data rate in a limited bandwidth). A lower order MCS includes fewer symbols and thus fewer bits can be encoded. For example, the MCS can set a modulation type, including a phase and amplitude modulation for bit encoding. More advanced modulations (e.g. 256 quadrature amplitude modulation) transfer more information. The MCS can support QPSK, 16 QAM, 64 QAM and 256 QAM modulation.

The MCS defines a code rate. The code rate is the ratio between a data bit and total transmitted bits (e.g., data+redundant bits). The redundant bits are added for forward error correction (FEC). This ratio is accordingly between a number of information bits at the top of the physical layer and a number of bits which are mapped to PDSCH at the bottom of the physical layer. A low coding rate corresponds to increased redundancy.

In some implementations, the MCS specifies a coding rate, or how many bits transfer information and how many are used for error correction. Higher values (e.g. ⅚) transfer more information. The MCS specifies a spatial streams, such as how many independent data streams are used. Higher values (e.g. 4 streams) increase data rates. The MCS can specify the guard interval which is a pause between each packet transmission. Short pauses allow the transmission of more packets.

The base station 320 tests different MCS levels in transmissions. Because some packets fail and other succeed, the base station is able to determine an optimal MCS for the channel. The UE can determine, from the PDSCH transmissions, the MCS threshold established in the channel. The capacity estimation module 324 is then configured to estimate (336) the channel capacity based on the determined MCS threshold of the PDSCH transmissions 318.

Once the capacity estimate (336) is completed (e.g., either using the LA-CSI-RS of data 316 or the PDSCH data transmission 318), the beam management module 310 is configured to select (338) a beam having the highest capacity value. In some implementations, any beam with a capacity value exceeding a threshold is selectable by the management module 310. In this example, beam capacity is estimated only until a "good enough" beam is found, rather than finding the absolute highest capacity beam. However, the beam management can alternatively test each beam candidate to find the highest capacity beam of the set of candidate beams 222.

FIG. 5 shows an illustration of an example set of beams 450 for selection by the beam selection module (e.g., module 208 of FIG. 2). The hierarchy starts with a finer (maximum) beam 452 and next neighboring beams 454a-b. While the initial beam in the example of FIG. 5 is the central beam 452, any of beams 452-460 can be the initial beam of the scan. The scan begins with a first beam (e.g., beam 452). For the first beam, link metrics (e.g., power) are compared to predefined thresholds. As previously discussed, the predefined thresholds can be determined based on machine learning approaches or through heuristic models.

The beam selection module 208 classifies each of the beams of set 450 into groups. In set of beams 450, five groups are shown as an illustrative example. The groups can be classified based on distance from the current beam 452. Each group can include one or more beams.

The beam selection module 208 is configured to scan successive groups to determine the candidate set of beams 222. The beam selection module 208 can start with group 1, then scan groups 1-2, then groups 1-3, and so forth. In a first scenario, a limited number of beam groups are scanned (e.g., group 1 or groups 1-2). In some second scenario, all the beams are scanned by the beam selection module 208.

The beam selection module terminates scanning when a particular link metric (e.g., link power) is above the predetermined threshold value. In some implementations, the metric can be and layer 1 (physical layer) related metric. For example, the metric can include throughput, receive power, SNR, SRQ, SSI, and so forth. The beam selection module 208 can send the selected beams as candidate beams for capacity estimation.

Figure 6:
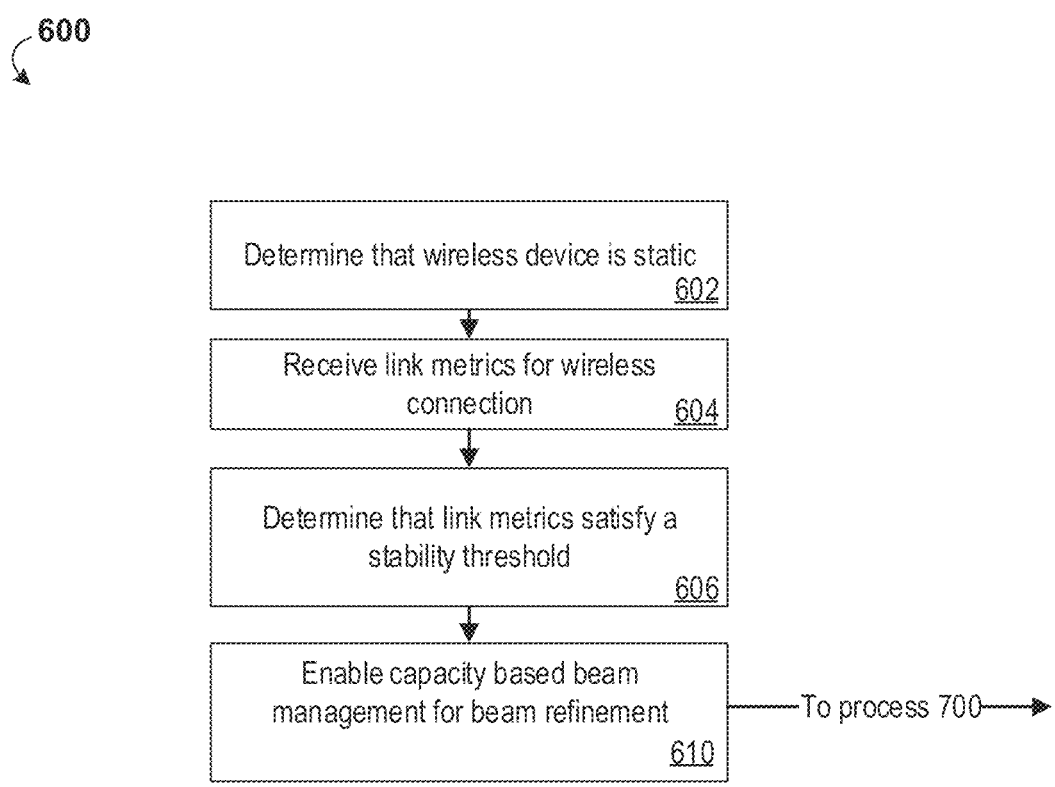
FIG. 6 illustrates an example process for sensor-assisted antenna and beam selection by the platforms or devices of FIG. 2 to FIG. 4.

FIG. 6 shows an example process 600 for beam capacity estimation by a UE (e.g., UE 101 of FIG. 1, device 200 of FIG. 2, or system 300 of FIGS. 3A-3B). A data processing system of the UE is configured to determine (602) that the UE is static. As previously described, the UE is static when the motion data indicates that rotation and translation values for the UE are below a threshold (e.g., —0) for a given period of time. For example, the UE can obtain motion data from one or both of accelerometers and gyroscopes. The state of the wireless device can be determined based on a given time period (e.g., the last few seconds). The motion data indicate a change (or lack thereof) in a position and/or orientation of the wireless device.

The data processing system of the UE receives (604) link metrics for the wireless connection. In an example, the link metrics can include SNR, delay spread, RSRQ, AoA, RSRP, received signal strength indicator (RSSI), or any similar link metrics indicating link stability. The wireless device is configured to determine, from the link metric values, values representing link stability. For example, a standard deviation of one or more of the RSRP, SNR, or delay spread, among others. Values can be measured for measurements of the respective link metric over a time period.

The UE compares the link metrics to threshold values to determine (606) that the link is stable. In some implementations, the threshold values can be set by a machine learning model based on training data, such as labeled link metrics that are labeled as representing a stable or unstable connection. For example, if a standard deviation value of a link metric exceeds a threshold (e.g., 1 dB for SNR), the link is considered unstable, even though the wireless device is not moving. If the UE is static, and the link metrics satisfy the stability thresholds, the UE initiates or enables (610) the beam refinement mode in which the capacity of one or more beams are tested to select a high throughput beam.

Figure 7:
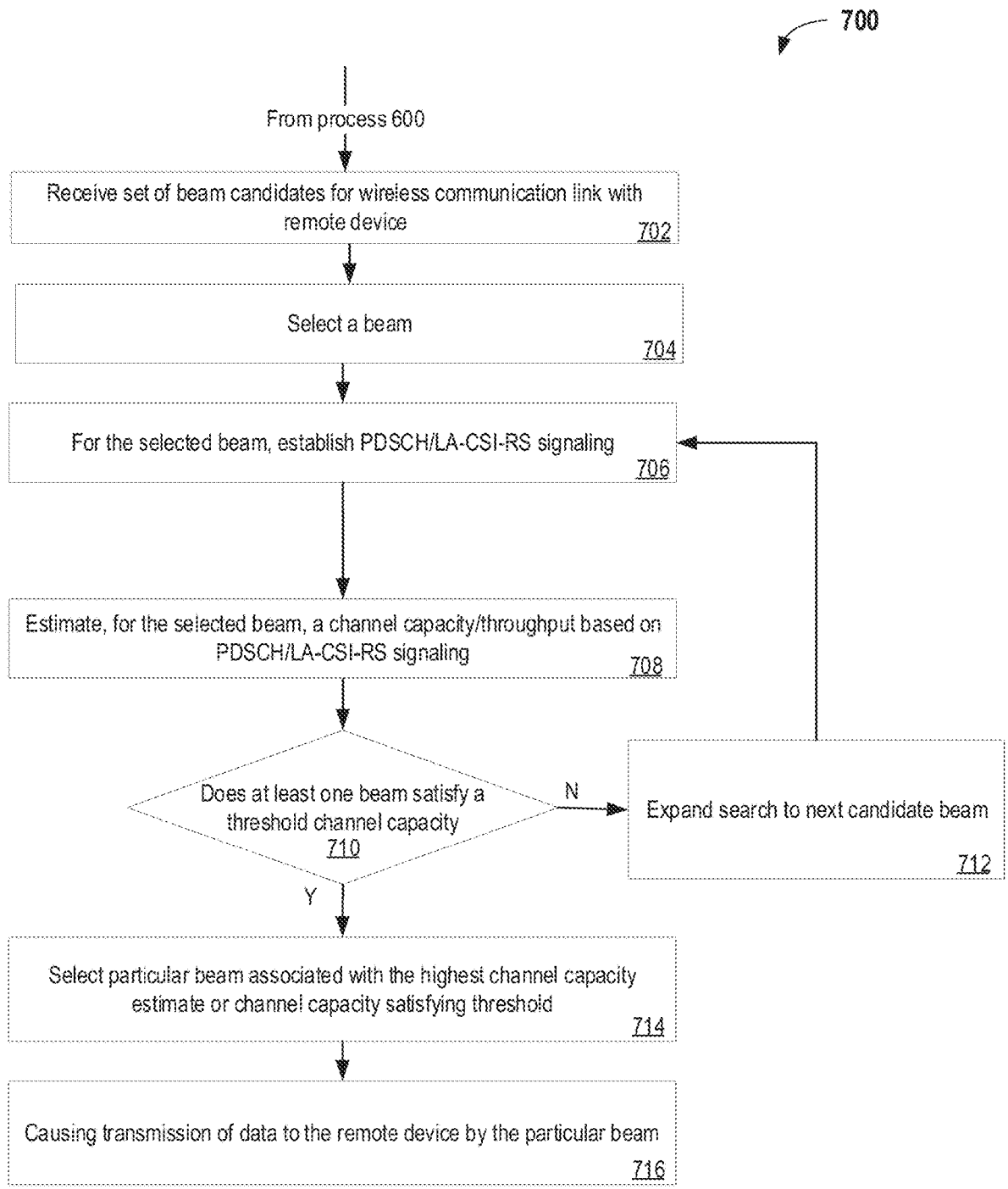
FIG. 7 illustrates a process for selection of a beam based on capacity estimation accordance with some implementations of the present disclosure.

FIG. 7 illustrates an example process 700 for selection of a beam in a beam refinement mode of the UE in accordance with some implementations of the present disclosure. In some examples, the electronic device(s), network(s), system(s), chip(s) or component(s), or portions or implementations thereof, of FIGS. 1-6 may be configured to perform the process 700. The process 700 includes receiving (708) a set of candidate beams for a communication from a wireless device (e.g., the UE) with a remote device (e.g., a base station). The candidate beams can be associated with link metrics above a threshold value. In some implementations, each of the candidate beams is selected based on a power level associated with the beam or a neighboring beam. The process 700 includes selecting (704) a beam, such as a beam associated with the highest power. In some implementations, any of candidate beams can be selected for testing capacity in any order.

The process 700 includes, for the selected beam, establishing (706) LA-CSI-RS or PDSCH signaling. In some implementations, the LA-CSI-RS is used to directly estimate (708) a capacity of the selected beam. In this example, the LA-CSI-RS is received periodically. The selected beam is maintained until the LA-CSI-RS is received for capacity estimation. In some implementations, the PDSCH signaling is used to indirectly estimate capacity. The base station uses a higher order MCS or lower order MCS during PDSCH signaling. The base station attempts to maximize throughput by adjusting the modulation order to test an upper order limit. The order of the MCS (e.g., the MCS thresholds) selected by the base station indicates a throughput of the channel to the UE.

The process 700 includes comparing (710) the estimated capacity to a threshold channel value. For example, the threshold value can include the highest capacity estimate so far of the candidate beams. In some implementations, the threshold capacity is set based on machine learning models. For example, the UE can measure capacity of various beams over time, and the machine learning model, based on the measurements, outputs a threshold indicating a target for capacity in the given scenario. In some implementations, the capacity threshold is set at a particular value, and the first candidate beam to exceed that threshold is selected for further communications. If no satisfactory beams are found, the data processing system expands (712) the search to the next candidate beam or a new set of beams.

The process 700 includes selecting (714) a particular beam of the candidate beams for further communications. In some implementations, the data processing system tests all candidate beams, and selects the particular beam with the highest capacity estimate. In some implementations, data processing system selects the first particular beam that satisfies a threshold capacity value.

The process 700 includes causing, by the data processing system, transmission (716) of data to the remote device (e.g., the base station) by the wireless device (e.g., the UE) using the particular beam. In some embodiments, the wireless device and the remote device are configured for mmWave communication using frequency range 2 (FR2). In some embodiments, the wireless device comprises at least three antenna arrays, and wherein each antenna array includes at least 10 beam configurations.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

EXAMPLES

In the following sections, further exemplary embodiments are provided.

Example 1 includes a method of operating a UE, the method comprising: determining, based on motion data form a motion sensor coupled to a wireless device, that a channel is stable for communications between the wireless device and a remote device; selecting, from a set of available beams, a set of candidate beams; for a candidate beam of the set of candidate beams, establishing signaling for a physical downlink shared channel (PDSCH); determine a modulation coding scheme (MCS) threshold set by the remote device for the PDSCH signaling; estimate, based on the MCS threshold, a channel capacity of the PDSCH; and selecting, based on the estimated channel capacity, a particular beam, from the set of candidate beams, for further PDSCH communication.

Example 2 includes a method of example 1 or some other example herein, wherein the MCS threshold represents a modulation order the MCS, the modulation order specifying a number of symbols and a coding rate of PDSCH signals, and wherein estimating the channel capacity comprises determining data throughput based on the number of symbols and the coding rate.

Example 3 includes the method of example 1 or some other example herein, wherein selecting the set of candidate beams is based on a relative power level of each candidate beam with respect to one or more other available beams.

Example 4 includes the method of example 3 or some other example herein, wherein selecting the set of candidate beams is based on a location of each candidate beam with respect to one or more other available beams.

Example 5 includes a method of example 1 or some other example herein, wherein determining that the channel is stable comprises: obtaining motion data from the motion sensor coupled to the wireless device; determining, from the motion data, that the wireless device is static relative to a remote device in communication with the wireless device; obtaining data representing one or more link metrics of the beam, the link metrics being associated with a period of time that the wireless device is static; and determining that a value of one or more of the link metrics satisfies a stability threshold value.

Example 6 includes a method of example 5 or some other example herein, wherein the one or more link metrics include at least one of a signal to noise (SNR) ratio of a signal received from the remote device, a delay spread value of the signal, a magnitude of a change in an angle of arrival (AoA) of the signal, or a reference signal received power (RSRP) of the signal.

Example 7 includes a method of example 1 or some other example herein, wherein the stability threshold value is based on a standard deviation of the value of one or more of the link metrics.

Example 8 includes the method of example 1 or some other example herein, wherein the motion sensor comprises one or more of an accelerometer, a gyroscope, or both the accelerometer and the gyroscope.

Example 9 includes the method of example 1 or some other example herein, wherein the wireless device and the remote device are configured for mmWave communication using frequency range 2 (FR2).

Example 10 includes the method of example 1 or some other example herein, the method further comprising retrieving the motion data periodically to determine if the wireless device is moving or is static.

Example 11 includes the method of example 1 or some other example herein, wherein the wireless device includes an antenna array including at least 10 beam configurations, and wherein selecting the particular beam comprises selecting one of the at least 10 beam configurations.

Example 12 includes a method of operating a UE, the method comprising: determining, based on motion data form a motion sensor coupled to a wireless device, that a channel is stable for communications between the wireless device and a remote device; selecting, from a set of available beams, a set of candidate beams; for a candidate beam of the set of candidate beams, establishing signaling for a physical downlink shared channel (PDSCH); receiving a (LA) channel state information reference signal (LA-CSI-RS); estimating, based on the LA-CSI-RS, a channel capacity of the PDSCH; and selecting, based on the estimated channel capacity, a particular beam, from the set of candidate beams, for further PDSCH communication.

Example 13 includes the method of example 12 or some other example herein, wherein selecting the set of candidate beams is based on a relative power level of each candidate beam with respect to one or more other available beams.

Example 14 includes the method of example 12 or some other example herein, wherein selecting the set of candidate beams is based on a location of each candidate beam with respect to one or more other available beams.

Example 15 includes the method of example 12 or some other example herein, wherein determining that the channel is stable comprises: obtaining motion data from the motion sensor coupled to the wireless device; determining, from the motion data, that the wireless device is static relative to a remote device in communication with the wireless device; obtaining data representing one or more link metrics of the beam, the link metrics being associated with a period of time that the wireless device is static; and determining that a value of one or more of the link metrics satisfies a stability threshold value.

Example 16 includes the method of example 15 or some other example herein, wherein the one or more link metrics include at least one of a signal to noise (SNR) ratio of a signal received from the remote device, a delay spread value of the signal, a magnitude of a change in an angle of arrival (AoA) of the signal, or a reference signal received power (RSRP) of the signal.

Example 17 includes the method of example 12 or some other example herein, wherein the stability threshold value is based on a standard deviation of the value of one or more of the link metrics.

Example 18 includes the method of example 12 or some other example herein, wherein the motion sensor comprises one or more of an accelerometer, a gyroscope, or both the accelerometer and the gyroscope.

Example 19 includes the method of example 12 or some other example herein, wherein the wireless device and the remote device are configured for mmWave communication using frequency range 2 (FR2).

Example 20 includes the method of example 12 or some other example herein, wherein the operations further comprising retrieving the motion data periodically to determine if the wireless device is moving or is static.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

What is claimed is:

1. A method, comprising:
   determining, based on motion data from a motion sensor coupled to a wireless device, that a channel is stable for communications between the wireless device and a remote device;
   selecting, from a set of available beams, a set of candidate beams;
   for a candidate beam of the set of candidate beams, establishing signaling for a physical downlink shared channel (PDSCH);
   determining a modulation and coding scheme (MCS) threshold set by the remote device for the PDSCH signaling;
   estimating, based at least on the MCS threshold, a channel capacity of the PDSCH; and
   selecting, based at least on the estimated channel capacity, a particular beam from the set of candidate beams, for further PDSCH communication.

2. The method of claim 1, wherein the MCS threshold represents a modulation order of the MCS, the modulation order specifying a number of symbols and a coding rate of PDSCH signals, and wherein estimating the channel capacity comprises determining data throughput based on the number of symbols and the coding rate.

3. The method of claim 1, wherein selecting the set of candidate beams comprises selecting the set of candidate beams based at least on a relative power level of each candidate beam with respect to one or more other available beams.

4. The method of claim 1, wherein selecting the set of candidate beams comprises selecting the set of candidate beams based at least on a location of each candidate beam with respect to one or more other available beams.

5. The method of claim 1, wherein determining that the channel is stable comprises:
   obtaining motion data from one or more motion sensors coupled to the wireless device;
   determining, from the motion data, that the wireless device is static relative to the remote device in communication with the wireless device;
   obtaining data representing one or more link metrics of the beam, the link metrics being associated with a period of time that the wireless device is static; and
   determining that a value of one or more of the link metrics satisfies a stability threshold value.

6. The method of claim 5, wherein the one or more link metrics include at least one of a signal to noise (SNR) ratio of a signal received from the remote device, a delay spread value of the signal, a magnitude of a change in an angle of arrival (AoA) of the signal, or a reference signal received power (RSRP) of the signal.

7. The method of claim 5, wherein the stability threshold value is based at least on a standard deviation of the value of one or more of the link metrics.

8. The method of claim 5, wherein the one or more motion sensors comprise one or more of an accelerometer or a gyroscope.

9. The method of claim 1, wherein the wireless device and the remote device are configured for millimeter wave (mm-Wave) communication using frequency range 2 (FR2).

10. The method of claim 1, further comprising retrieving the motion data periodically to determine if the wireless device is moving or is static.

11. The method of claim 1, wherein the wireless device includes an antenna array including at least 10 beam configurations, and wherein selecting the particular beam comprises selecting one of the at least 10 beam configurations.

12. A method, comprising:
    determining, based on motion data from a motion sensor coupled to a wireless device, that a channel is stable for communications between the wireless device and a remote device;
    selecting, from a set of available beams, a set of candidate beams;
    for a candidate beam of the set of candidate beams, establishing signaling for a physical downlink shared channel (PDSCH);
    receiving a link adaptation (LA) channel state information reference signal (LA-C SI-RS);
    estimating, based at least on the LA-CSI-RS, a channel capacity of the PDSCH; and
    selecting, based at least on the estimated channel capacity, a particular beam from the set of candidate beams, for further PDSCH communication.

13. The method of claim 12, wherein selecting the set of candidate beams comprises selecting the set of candidate beams based at least on a relative power level of each candidate beam with respect to one or more other available beams.

14. The method of claim 12, wherein selecting the set of candidate beams comprises selecting the set of candidate beams based at least on a location of each candidate beam with respect to one or more other available beams.

15. The method of claim 12, wherein determining that the channel is stable comprises:
    obtaining motion data from one or more motion sensors coupled to the wireless device;
    determining, from the motion data, that the wireless device is static relative to the remote device in communication with the wireless device;
    obtaining data representing one or more link metrics of the beam, the link metrics being associated with a period of time that the wireless device is static; and
    determining that a value of one or more of the link metrics satisfies a stability threshold value.

16. The method of claim 15, wherein the one or more link metrics include at least one of a signal to noise (SNR) ratio of a signal received from the remote device, a delay spread value of the signal, a magnitude of a change in an angle of arrival (AoA) of the signal, or a reference signal received power (RSRP) of the signal.

17. The method of claim 15, wherein the stability threshold value is based at least on a standard deviation of the value of one or more of the link metrics.

18. One or more processors for a user equipment (UE), the one or more processors comprising:
    circuitry configured to communicate with a remote device; and
    circuitry to execute one or more instructions that, when executed, cause the processor to perform operations comprising:

determining, based at least on motion data from a motion sensor coupled to a wireless device, that a channel is stable for communications between the wireless device and a remote device;

selecting, from a set of available beams, a set of candidate beams;

for a candidate beam of the set of candidate beams, establishing signaling for a physical downlink shared channel (PDSCH);

determining a modulation and coding scheme (MCS) threshold set by the remote device for the PDSCH signaling;

estimating, based at least on the MCS threshold, a channel capacity of the PDSCH; and selecting, based at least on the estimated channel capacity, a particular beam, from the set of candidate beams, for further PDSCH communication.

19. The one more processors of claim 18, wherein selecting the set of candidate beams comprises selecting the set of candidate beams based at least on a relative power level of each candidate beam with respect to one or more other available beams.

20. The one more processors of claim 18, wherein determining that the channel is stable comprises:

obtaining motion data from the motion sensor coupled to the wireless device;

determining, from the motion data, that the wireless device is static relative to the remote device in communication with the wireless device;

obtaining data representing one or more link metrics of the beam, the link metrics being associated with a period of time that the wireless device is static; and determining that a value of one or more of the link metrics satisfies a stability threshold value.

\* \* \* \* \*

UNITED STATES PATENT AND TRADEMARK OFFICE
CERTIFICATE OF CORRECTION

PATENT NO. : 12,250,050 B2
APPLICATION NO. : 17/848564
DATED : March 11, 2025
INVENTOR(S) : Ioannis Pefkianakis et al.

Page 1 of 1

It is certified that error appears in the above-identified patent and that said Letters Patent is hereby corrected as shown below:

In the Claims

Column 26, Line 25, In Claim 12, delete "(LA-C SI-RS);" and insert -- (LA-CSI-RS); --.

Signed and Sealed this
Twenty-second Day of April, 2025

Coke Morgan Stewart
*Acting Director of the United States Patent and Trademark Office*